US008295649B2

(12) United States Patent
Berini et al.

(10) Patent No.: US 8,295,649 B2
(45) Date of Patent: Oct. 23, 2012

(54) SYSTEM AND METHOD FOR PARALLEL PROCESSING OF IMAGES FROM A LARGE NUMBER OF CAMERAS

(75) Inventors: Dario Berini, Ashburn, VA (US); Simion Adrian Moica, Ottawa (CA); Prateek Srivastava, Ottawa (CA); Gary Van Beek, North Gower (CA); Hooman Dadrassan, Ottawa (CA); Bryon Fevens, Nepean (CA)

(73) Assignee: Nextgenid, Inc., San Antonio, TX (US)

( * ) Notice: Subject to any disclaimer, the term of this patent is extended or adjusted under 35 U.S.C. 154(b) by 0 days.

(21) Appl. No.: 11/937,312

(22) Filed: Nov. 8, 2007

(65) Prior Publication Data

US 2008/0123967 A1    May 29, 2008

Related U.S. Application Data

(60) Provisional application No. 60/864,840, filed on Nov. 8, 2006.

(51) Int. Cl.
*G06K 9/60* (2006.01)
*G06K 9/00* (2006.01)

(52) U.S. Cl. .................. 382/304; 382/103; 382/118

(58) Field of Classification Search .................. 382/304
See application file for complete search history.

(56) References Cited

U.S. PATENT DOCUMENTS

| | | | |
|---|---|---|---|
| 5,974,158 A * | 10/1999 | Auty et al. ................ | 382/103 |
| 6,850,252 B1 * | 2/2005 | Hoffberg ................... | 715/716 |
| 6,975,346 B2 * | 12/2005 | Kumhyr ..................... | 348/143 |
| 7,065,250 B1 * | 6/2006 | Lennon ...................... | 382/224 |
| 7,095,328 B1 * | 8/2006 | Stern et al. ................ | 340/573.1 |
| 7,123,166 B1 * | 10/2006 | Haynes et al. .............. | 340/932.2 |
| 2002/0120925 A1 * | 8/2002 | Logan ........................ | 725/9 |
| 2003/0108334 A1 * | 6/2003 | Nevenka et al. ............ | 386/95 |
| 2003/0185301 A1 * | 10/2003 | Abrams et al. ............ | 375/240.12 |
| 2003/0185302 A1 * | 10/2003 | Abrams, Jr. ............... | 375/240.12 |
| 2004/0022516 A1 * | 2/2004 | Yamashiro et al. .......... | 386/13 |
| 2004/0117638 A1 * | 6/2004 | Monroe ..................... | 713/186 |
| 2004/0130620 A1 * | 7/2004 | Buehler et al. ............ | 348/143 |
| 2004/0208114 A1 * | 10/2004 | Lao et al. .................. | 369/125 |
| 2004/0225629 A1 * | 11/2004 | Eder ........................... | 706/46 |
| 2005/0122397 A1 * | 6/2005 | Henson et al. ............ | 348/143 |
| 2005/0163345 A1 * | 7/2005 | van den Bergen et al. ... | 382/103 |
| 2005/0163346 A1 * | 7/2005 | van den Bergen et al. ... | 382/103 |
| 2005/0265582 A1 * | 12/2005 | Buehler et al. ............ | 382/103 |
| 2006/0072014 A1 * | 4/2006 | Geng et al. ................ | 348/159 |
| 2006/0085477 A1 * | 4/2006 | Phillips et al. ............. | 707/104.1 |
| 2006/0126093 A1 * | 6/2006 | Fedorovskaya et al. ..... | 358/1.14 |
| 2006/0133699 A1 * | 6/2006 | Widrow et al. ............ | 382/305 |
| 2006/0155398 A1 * | 7/2006 | Hoffberg et al. ........... | 700/86 |

(Continued)

FOREIGN PATENT DOCUMENTS

WO    WO 2006025797 A1 *    3/2006

*Primary Examiner* — David Zarka
(74) *Attorney, Agent, or Firm* — Nixon Peabody LLP (57) ABSTRACT

A system and method for processing images includes a plurality of image providers configured to transmit images. A plurality of destination processors receives the transmitted images and transforms the transmitted images to internally useable image data. A plurality of feature object engines find and identify in the internally useable image data a plurality of objects. A plurality of object classifier engines index and classify the plurality of objects found by the feature object engines.

53 Claims, 4 Drawing Sheets

Field Deployment Of The System

U.S. PATENT DOCUMENTS

| | | | |
|---|---|---|---|
| 2006/0157559 A1* | 7/2006 | Levy et al. | 235/380 |
| 2006/0173560 A1* | 8/2006 | Widrow | 700/48 |
| 2006/0190419 A1* | 8/2006 | Bunn et al. | 706/2 |
| 2006/0262976 A1* | 11/2006 | Hart et al. | 382/190 |
| 2006/0274978 A1* | 12/2006 | Fukuda et al. | 382/305 |

* cited by examiner

Field Deployment Of The System

FIG. 4

SYSTEM AND METHOD FOR PARALLEL PROCESSING OF IMAGES FROM A LARGE NUMBER OF CAMERAS This application claims priority from U.S. Provisional Patent Application Ser. No. 60/864,840 entitled "System and Method for Processing Images From a Large Number of Disparate Cameras" filed Nov. 8, 2006, which is incorporated herein by reference in its entirety.

BACKGROUND

There are numerous applications where video images are taken and recorded. Some of these applications involve the recording of video while a transaction is taking place, e.g., at an ATM or at a bank counter. The use of video recording is anticipated to increase significantly in the immediate future, such as in shopping centers, aboard buses and trains, and the like. Digital recording of video takes enormous amounts of recording space despite compression techniques such as MPEG, the use of slow video acquired at several frames per second rather than at a full 30 frames-per-second, and reductions in resolution. As a result, the recording times of digital recorders with multiple video inputs are still limited despite the use of large Giga and Terra Byte storage devices.

For some time now, there have been market available machine vision cameras and systems that can be programmed to detect certain geometrical objects. In general these objects have a very simple geometry such as nuts, bolts, engine parts, etc. In the case of face finding and processing the current state of the art is a slow process that requires massive computing power and hardware, often resulting in a system too complex to be reliable and manageable. Such a system, since requiring many components to be feasible, is difficult to deploy and scale.

A real-time processing system built with the current state-of-the-art would be cost prohibitive; as a compromise, system architects of these systems often trade-off complexity for performance. This typically results in small systems processing recorded images. Such systems are slow and incapable of processing images in real time. An improved system for image recognition is highly desirable.

SUMMARY OF THE INVENTION

In one embodiment, the invention provides a system for processing images, the system including a plurality of image providers configured to transmit images. A plurality of destination processors receives the transmitted images and transforms the transmitted images to internally useable image data. A plurality of feature object engines finds and identifies in the internally useable image data a plurality of objects. A plurality of object classifier engines index and classify the plurality of objects found by the feature object engines.

In another embodiment, the invention is a method for processing images. Images are transmitted to a destination processor. The received images are transformed to internally usable data. A plurality of objects is identified in the internally useable image data.

In yet another embodiment, the invention is an image source comprising an image provider configured to transmit an image to an image enhancement device and an image enhancement device configured to add additional information to the image and to retransmit the image.

DETAILED DESCRIPTION

In one embodiment, the invention is directed to a system for processing multiple image sources in real time as static data or streams, multiple recorded images as static data or streams, media files, or any combination of the above. The system may classify multiple objects in the image concurrently based on their features and generate feature based indexing results. The system may classify and index the found objects in the images based on their closeness to the feature set used to search. The system may search for multiple, uncorrelated patterns or supersets of features concurrently. For example, the system may be provided with the capability to search concurrently for multiple patterns in the same image at the same time by distributing the processing load among its processing units such that specific units are searching for specific patterns at a given time.

The system may be implemented such that it is capable of changing its behavior on the fly by field reconfiguration while in operation, by switching in real time to search for a new pattern as soon as the new pattern is available to its engines through the downloading process. The system may be redundant and hot swappable, providing no single point of failure. This functionality may be obtained by duplicating the processing paths, sharing and redistribution of processing loads and load balancing, while also providing hot spares capable of taking over the work of faulty units in the system. Every single unit in the system may be provided with hot swap capability.

The system may provide various outputs consisting of both image and textual data. The system may be implemented such that it is capable of using specific image patterns as trigger events. This means that once specific patterns have been found in the images, those events can trigger the generation and output, in standardized formats, of, for example: video streams starting from a user-specified point in time relative to the trigger event; static images at user-specified times relative to the trigger event; metadata related to the triggering event such as input image source identification, timestamps and physical location and orientation of the image source, type, position, and size of the found patterns in the image, and other comprehensive standardized tags that facilitate database indexing of the event and its accompanying data.

Figure 1:
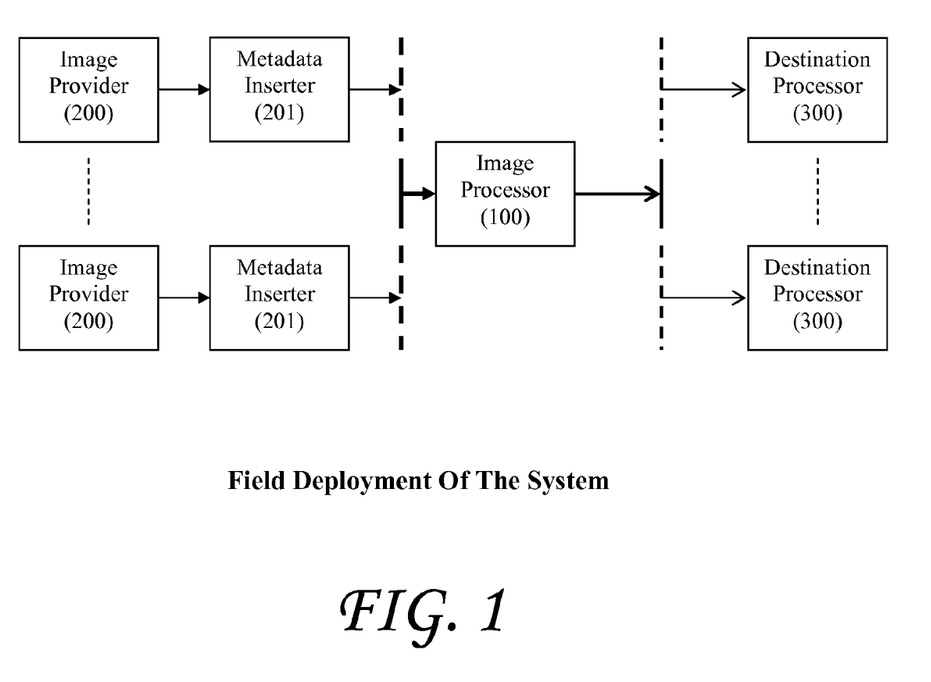
FIG. 1 is a high level block diagram of one embodiment of a system for processing images from at least one of a plurality of image providers and transmitting the results to at least one of a plurality of destination processors.
Figure 2:
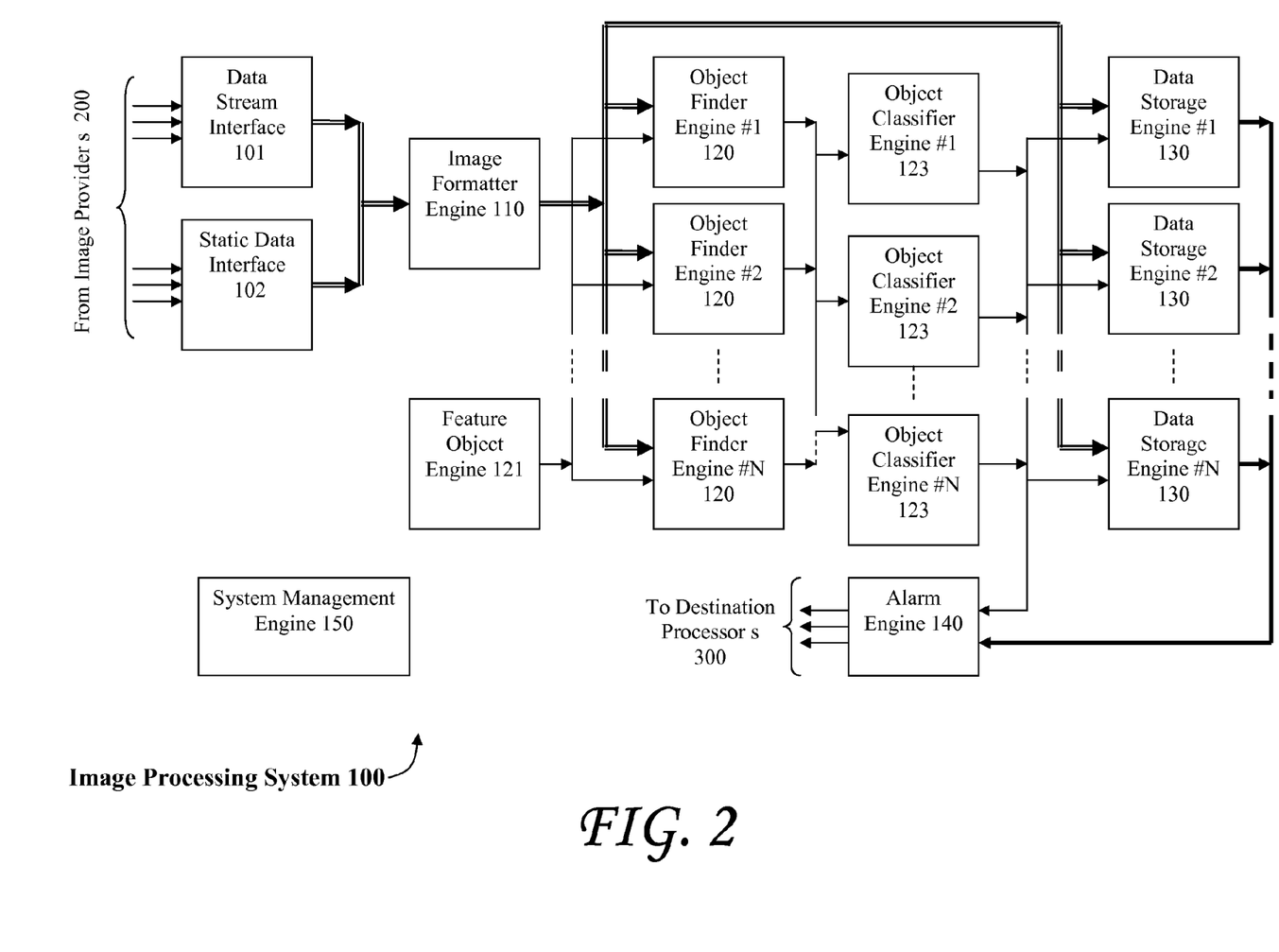
FIG. 2 is a detailed block diagram of one embodiment of a system for processing images from at least one of a plurality of image providers and transmitting the results to at least one of a plurality of destination processors.

Referring first to FIG. 1, in one embodiment, the invention is directed to a system 100 for processing images from at least one of a plurality of image providers 200 and transmitting the processing results to at least one of a plurality of destination processors 300. Referring next to FIG. 2, the image processing system 100 connects to image providers 200 through real-time data stream acquisition interfaces 101 and real-time static data acquisition interfaces 102, transforms the provided data, using at least one of a plurality of image formatter engines 110, into internally useable image data formats, specifies, through a feature object engine 121, at least one of a plurality of specific, uncorrelated and complex feature-based objects types to be found and identified in the image data.

In one embodiment, the system finds and identifies in the image data, using at least one of a plurality of object finder engines 120, multiple objects of the required type specified by the feature object engine 121, indexes and classifies, using at least one of a plurality of object classifier engines 122, the plurality of objects found by the object finder engine 120, stores image data, using at least one of a plurality of data storage engines 130, related to pre- and post-object finding, and generates alerts. The system may additionally provide a system management engine 150, to the entire system which performs operations such as status report generation, on the fly reconfigurability, code updates, upgrades, and so forth.

Figure 3:
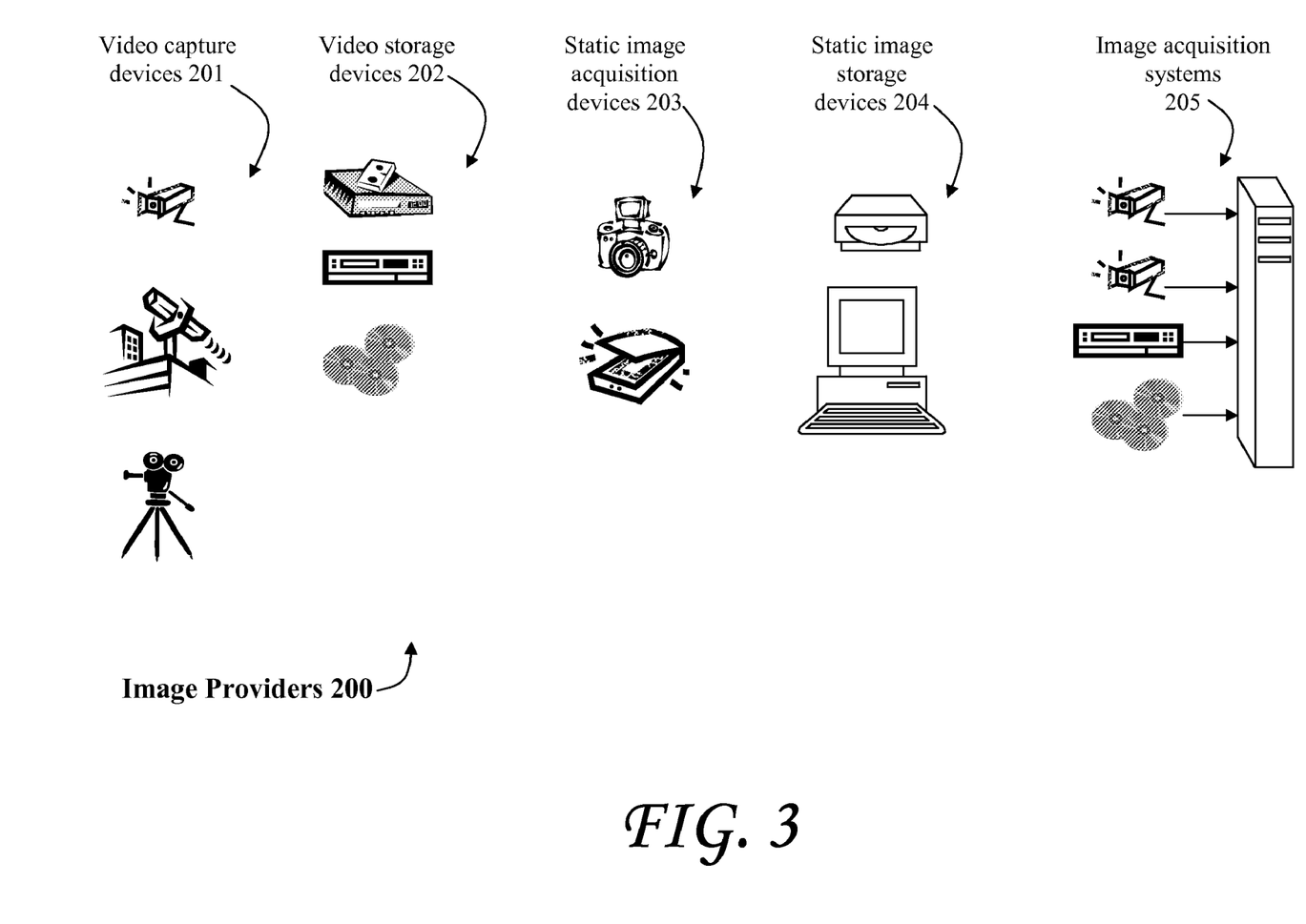
FIG. 3 is a diagram illustrating some of the types of image providers that may provide images to at least one embodiment of the disclosed system and method.

Referring next to FIG. 3, in one embodiment, any one of the plurality of the image providers 200 may provide any type of real-time or recorded, dynamic or static image data streams or files such as: any type of video capture devices 201 such as analog or digital video cameras; any type of video storage devices 202 such as analog or digital video recorders; any type of static image acquisition devices 203 such as digital photo cameras and scanners; any type of static image storage devices 204 such as digital computer files; or any combination of the above such as other image acquisition systems 205.

Figure 4:
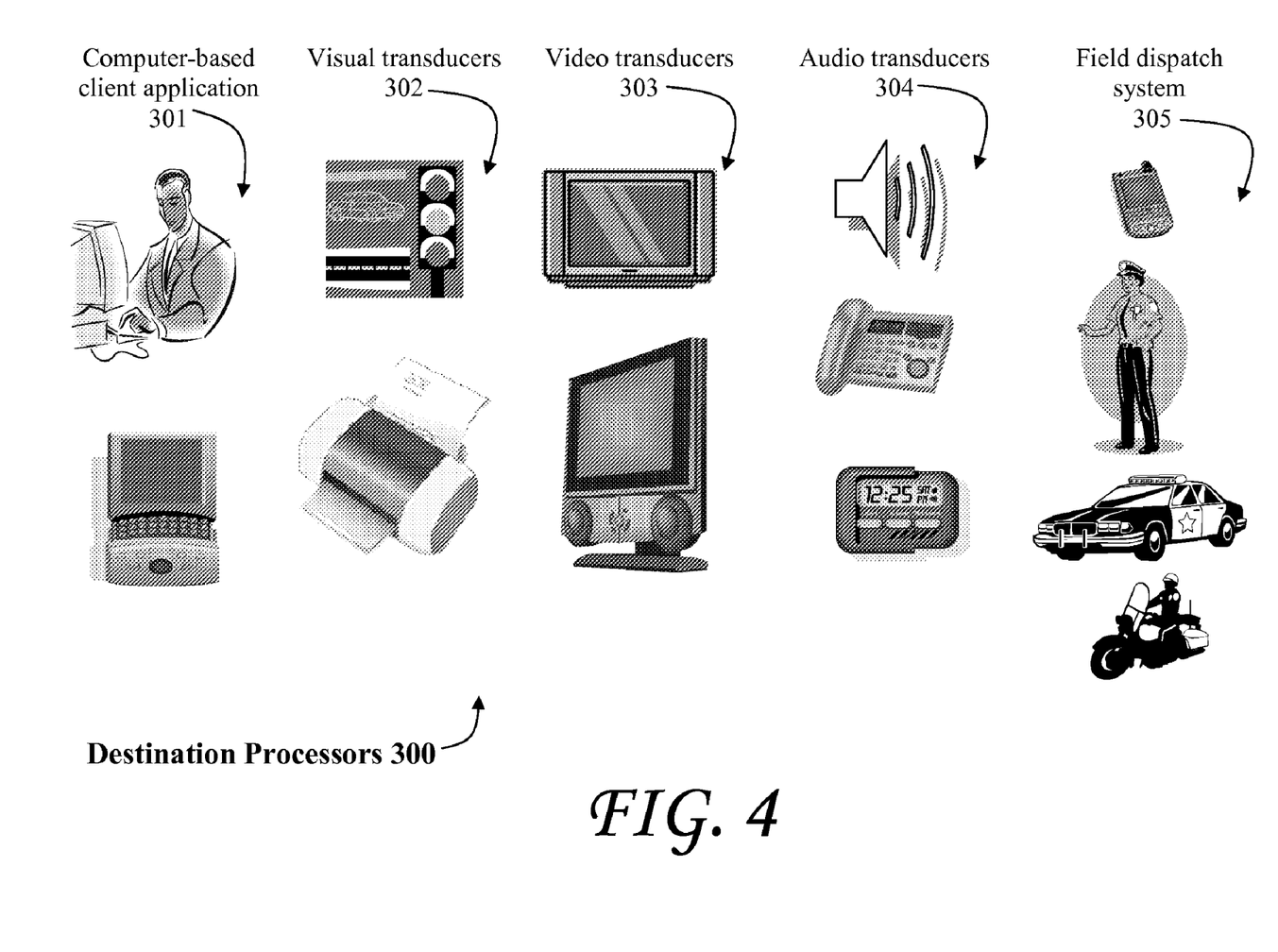
FIG. 4 is a diagram illustrating some of the types of destination processors that may receive processing results from at least one embodiment of the disclosed system and method.

Referring next to FIG. 4, in one embodiment, any one of the plurality of the destination processors 300 may be: any computer-based client application 301 such as software applications; any type of visual transducers 302 such as visual displays; any type of video transducers 303 such as video displays; any type of audio transducers 304 such as telephones; or any combination of the above 305, for example, a field dispatch system.

In one embodiment, the system may be used for face recognition. The output may be user definable and comprise one or more of the following: a standardized format video stream starting from a user specified point in time relatively to a trigger event; or a static image of standardized format such as a normalized ICAO International Civil Aviation Organization Type 2 and/or Type 3 image. This implies processing and improving the quality of an image in such a way to provide an optimum face image to a face recognition system that is internationally recognized and used for biometric face recognition and travel document other standardized image formats.

Metadata related to the triggering event may be: input image source identification file or camera; timestamps and physical location and orientation of the image source in the case of a camera it refers to its deployment location—GPS coordinates for outdoor camera—and its orientation—direction of where camera is looking—compass coordinates; position and size of faces found in the image together with primary landmarks, position of eyes and optional secondary landmarks positions of tip of the nose, corners of mouth, chin, etc., orientation of the face pitch, roll, and yaw angles, quality of the face image blur factor, brightness/contrast factors, etc.

In one embodiment, the system may be based on embedded processor architecture which provides a number of advantages: reduced footprint; reduced power consumption; reduced heat dissipation; automatic, fast system booting; easy and user friendly deployment practically deployable anywhere; modular deployment configuration tailored to user's needs; and scalable and tailored to user's needs (i.e. single to large enterprise camera source.)

One image source disclosed herein is hereinafter referred to as a "Camera Passport." A Camera Passport is a small low power device that when attached to deployed cameras provides both preprogrammed and real time camera information data embedded in the video data signal or stream. For example, in the case of the analog cameras, the Camera Passport device is attached as a pass-through on the video data signal path embedding the camera information on the Vertical Blanking Interval, similar to close captioning systems. In fact, the embedded data is compatible with the close captioning format facilitating the visualization of the camera information on any closed-captioning-enabled display set.

The information data embedded in the video signal relates to, but is not limited to: unique identification number that is user or factory programmable for the camera; optional programmable name and location; optional GPS location data; optional compass orientation data; optional manual and user alerts. Any or all of these embedded data can be used for video routing and/or modification of system behavior. Video routing commands can be as simple as making a video feed the highest priority and display it on the alerts monitors at the monitoring station.

The video routing commands may respond to alerts, which may be related to, for example, an officer in distress. An officer in vicinity of a camera can issue an encoded radio distress information signal which is received by the Camera Passport device and forwarded via the video cable to the monitoring station. In the case of a stolen car where cars are quipped with antitheft devices, the device may emit a distress signal which will cause the image from a particular camera, and any subsequent camera that receives that distress signal, to be displayed on the alerts monitors at the monitoring station.

Fire/smoke in the surveillance area (such as fire/smoke/explosion patterns, which when found will be treated as trigger events) may generate an alert. Motion, for example, in the case of surveillance areas where no motion is allowed at specific periods of time, may also generate an alert. The system may also process more complex objects, such as human faces or moving military vehicles, which have many different and dissimilar appearances. In the case of face finding most of the applications will center on the capture of facial images and only sometimes will require the capture of the "scene", i.e. the full field of view of the camera. The system may also capture full video that might be useful, as in the case of a hold-ups, altercations of some kind, etc. where additional motion-containing information may be of benefit.

The use of face-finding algorithms together with the use of image analysis software to determine the best pose, best quality facial image, facial feature points, eye locations may enable the saving of huge amounts of recording space when only a single, good quality, image is recorded per transaction/incident. Additionally, image processing software to correct images such as de-tilting, color saturation and balance, exposure and sizing as example may save computer processing time and eliminate the need for external processors.

Even though the above sections refer to facial detection and associated image quality analysis it should be realized that such are only examples of pattern recognition of one kind or another. Note that noise may also be a trigger event, for example, in the case of surveillance areas where no noise is allowed at specific periods of time, when noise is detected it will be treated as a trigger event.

The invention as taught and described herein may be used in combination with the systems and methods described in U.S. patent application Ser. No. 11/929,429 entitled "Computerized Biometric Passenger Identification System and Method" filed Oct. 30, 2007, the entire disclosure of which is incorporated herein by reference.

While the invention has been particularly shown and described with reference to a preferred embodiment thereof, it will be understood by those skilled in the art that various changes in form and details may be made therein without departing from the spirit and scope of the invention.

We claim:

1. An autonomous system for processing video streams or single images, comprising:
    a plurality of image providers configured to transmit images in a plurality of image streams;
    a plurality of destination processors configured to receive the transmitted images and to transform the transmitted images to internally useable image data;
    a plurality of feature object engines configured to find and identify in the internally useable image data a plurality of objects;
    a plurality of object classifier engines configured to index and classify the plurality of objects found by the feature object engines;
    a plurality of metadata inserters configured to embed information into the plurality of image streams; and
    a plurality of intelligent video multiplexers or routers that use the metadata embedded in the plurality of image streams to route the video data to one or more downstream destination processors,
    wherein the information includes data relating to a face comprising one or more of: facial biometrics, a position of the face, a size of the face, landmarks of the face, an orientation of the face, and a quality of the face image, and
    the intelligent video multiplexers or routers use the metadata to dynamically prioritize the plurality of image streams to ensure that higher priority streams are assigned to operational downstream destination processors before assigning lower priority streams.

2. The system for processing images of claim 1, further comprising a plurality of metadata inserters configured to embed information comprising metadata into the plurality of image streams, wherein the information is at least one type of information selected from the list: static information, dynamic information.

3. The system for processing images of claim 2, further comprising a plurality of alarm engines that generate actionable activities based on the output of the destination processors and the metadata provided by the metadata inserters.

4. The system for processing images of claim 2, wherein the information includes static data selected from the group consisting of: name of the camera location, serial number of the camera, image source or identification file.

5. The system for processing images of claim 2, wherein the information includes dynamic data related to an environmental monitoring system.

6. The system for processing images of claim 5, wherein the environmental monitoring system comprises at least one system selected from a set consisting of: fire alarms in the surveillance area, smoke alarms in the surveillance area, noise detector in surveillance area, motion detector in the surveillance area, current physical location of the camera using devices such as GPS system or beacons, current compass bearing where the camera is pointing, timestamp, auxiliary alarm system, lojack in a stolen car, access and proximity sensors, or control systems.

7. The system for processing images of claim 2, wherein the information includes dynamic data generated at the request of a person selected from the list consisting of: officer in distress, person at a front door, first responders, panic buttons, voice commands and recognition systems.

8. The system for processing images of claim 2, further comprising one or more decision engines which generate alarms in response to the classification of the objects found by one of the feature object engines.

9. The system for processing images of claim 8, wherein the alarm is accompanied by metadata related to a triggering event.

10. The system for processing images of claim 9, wherein the information includes data related to a target object, selected from the list consisting of:
    position of the object, orientation of the object, position and orientation of sub-feature of the object, quality of the image, blur factor, or brightness or contrast factors.

11. The system for processing images of claim 10, wherein the information includes data relating to a face selected from the group consisting of: a position of eyes, a position of tip of the nose or corners of mouth, and orientation of the face including pitch, roll, and yaw angles.

12. The system for processing images of claim 2, wherein the information and additional metadata generated after image processing, is used to generate an actionable activity selected from the set consisting of: decision to send the data and image for long term storage, send image data to video displays being monitored by operators, perform object recognition, send pertinent information to field dispatch systems, or raise visual or audio alarms.

13. The system for processing images of claim 1, wherein the plurality of image providers includes at least one image provider selected from the list consisting of: an analog or digital video camera, an analog or digital video recorder, a static image acquisition device, or a static image storage device.

14. The system for processing images of claim 1, wherein the destination processors include at least one image provider selected from the list consisting of: a computer-based client application, a visual transducer, a video transducer, or an audio transducer.

15. The system for processing images of claim 1, wherein the system is configured such that the lower priority stream is not processed further in the case of downstream destination process unavailability.

16. The system for processing images of claim 1, wherein the intelligent video multiplexers or routers use the information to assign more than one of the plurality of image streams to one downstream destination processor to maximize resource usage.

17. The system for processing images of claim 1, wherein the system is configured to utilize destination processors based on one or more of the following: application specific hardware architecture, reconfigurable hardware architecture, or embedded processors architecture.

18. The system for processing images of claim 17, wherein destination processors are configured to alter their behavior, and be targeted to find a different class of object.

19. The system for processing images of claim 1, wherein the system is configured for face recognition and outputs a standardized format video stream.

20. The system for processing images of claim 19, wherein the standardized format video stream frames are processed and normalized to International Civil Aviation Organization (ICAO) static image format, type 2 or type 3, International Organization for Standardization format (ISO) or International Committee for Information Technology Standards (INCITS) or any other required image standards.

21. The system for processing images of claim 1, wherein at least one of the image providers is an image enhancement device comprising: an image provider configured to transmit an image to an image enhancement device, or an image enhancement device configured to add additional information to the image and to retransmit the image.

22. The system for processing images of claim 21, wherein at least one image provider is a video camera and the additional data is embedded in the camera information on a Vertical Blanking Interval.

23. The system for processing images of claim 1, further comprising a system management engine which manages the system and performs system management functions.

24. The system for processing images of claim 23, wherein the system management engine performs one or more operations selected from the list consisting of: status report generation, reconfiguration, code updates and code upgrades.

25. The system for processing images of claim 1, wherein the system is configured to utilize a flexible and scalable modular deployment configuration tailored to an application's need where destination processors are added as required to deploy additional functionality.

26. The system for processing images of claim 1, wherein each of the plurality of image providers and the plurality of destination processors is hot swappable.

27. An autonomous system for processing video streams or single images, comprising:
 a plurality of image providers configured to transmit images in a plurality of image streams;
 a plurality of destination processors configured to receive the transmitted images and to transform the transmitted images to internally useable image data;
 a plurality of feature object engines configured to find and identify in the internally useable image data a plurality of objects;
 a plurality of object classifier engines configured to index and classify the plurality of objects found by the feature object engines;
 a plurality of metadata inserters configured to embed information into the plurality of image streams; and
 a plurality of intelligent video multiplexers or routers that use the metadata embedded in the plurality of image streams to route the video data to one or more downstream destination processors,
 wherein the information includes data relating to a face comprising one or more of: facial biometrics, a position of the face, a size of the face, landmarks of the face, an orientation of the face, and a quality of the face image, and
 the intelligent video multiplexers or routers use the metadata to assign one of the plurality of image streams to more than one downstream destination processor to allow simultaneous identification of two or more different kinds of objects in the video stream.

28. The system for processing images of claim 27, further comprising a plurality of metadata inserters configured to embed information comprising metadata into the plurality of image streams, wherein the information is at least one type of information selected from the list: static information, dynamic information.

29. The system for processing images of claim 28, further comprising a plurality of alarm engines that generate actionable activities based on the output of the destination processors and the metadata provided by the metadata inserters.

30. The system for processing images of claim 28, wherein the information includes static data selected from the group consisting of: name of the camera location, serial number of the camera, image source or identification file.

31. The system for processing images of claim 28, wherein the information includes dynamic data related to an environmental monitoring system.

32. The system for processing images of claim 31, wherein the environmental monitoring system comprises at least one system selected from a set consisting of: fire alarms in the surveillance area, smoke alarms in the surveillance area, noise detector in surveillance area, motion detector in the surveillance area, current physical location of the camera using devices such as GPS system or beacons, current compass bearing where the camera is pointing, timestamp, auxiliary alarm system, lojack in a stolen car, access and proximity sensors, or control systems.

33. The system for processing images of claim 28, wherein the information includes dynamic data generated at the request of a person selected from the list consisting of: officer in distress, person at a front door, first responders, panic buttons, voice commands and recognition systems.

34. The system for processing images of claim 28, further comprising one or more decision engines which generate alarms in response to the classification of the objects found by one of the feature object engines.

35. The system for processing images of claim 34, wherein the alarm is accompanied by metadata related to a triggering event.

36. The system for processing images of claim 35, wherein the information includes data related to a target object, selected from the list consisting of: position of the object, orientation of the object, position and orientation of sub-feature of the object, quality of the image, blur factor, or brightness or contrast factors.

37. The system for processing images of claim 36, wherein the information includes data relating to a face selected from the group consisting of: a position of eyes, a position of tip of the nose or corners of mouth, and orientation of the face including pitch, roll, and yaw angles.

38. The system for processing images of claim 28, wherein the information and additional metadata generated after image processing, is used to generate an actionable activity selected from the set consisting of: decision to send the data and image for long term storage, send image data to video displays being monitored by operators, perform object recognition, send pertinent information to field dispatch systems, or raise visual or audio alarms.

39. The system for processing images of claim 27, wherein the plurality of image providers includes at least one image provider selected from the list consisting of: an analog or digital video camera, an analog or digital video recorder, a static image acquisition device, or a static image storage device.

40. The system for processing images of claim 27, wherein the destination processors include at least one image provider selected from the list consisting of: a computer-based client application, a visual transducer, a video transducer, or an audio transducer.

41. The system for processing images of claim 27, wherein the intelligent video multiplexers or routers use the information to assign more than one of the plurality of image streams to one downstream destination processor to maximize resource usage.

42. The system for processing images of claim 27, wherein the system is configured to utilize destination processors based on one or more of the following: application specific hardware architecture, reconfigurable hardware architecture, or embedded processors architecture.

43. The system for processing images of claim 42, wherein destination processors are configured to alter their behavior, and be targeted to find a different class of object.

44. The system for processing images of claim 27, wherein the system is configured for face recognition and outputs a standardized format video stream.

45. The system for processing images of claim 44, wherein the standardized format video stream frames are processed and normalized to International Civil Aviation Organization (ICAO) static image format, type 2 or type 3, International Organization for Standardization format (ISO) or International Committee for Information Technology Standards (IN-CITS) or any other required image standards.

46. The system for processing images of claim 27, wherein at least one of the image providers is an image enhancement device comprising: an image provider configured to transmit an image to an image enhancement device, or an image enhancement device configured to add additional information to the image and to retransmit the image.

47. The system for processing images of claim 46, wherein at least one image provider is a video camera and the additional data is embedded in the camera information on a Vertical Blanking Interval.

48. The system for processing images of claim 47, further comprising a system management engine which manages the system and performs system management functions.

49. The system for processing images of claim 48, wherein the system management engine performs one or more operations selected from the list consisting of: status report generation, reconfiguration, code updates and code upgrades.

50. The system for processing images of claim 27, wherein the system is configured to utilize a flexible and scalable modular deployment configuration tailored to an application's need where destination processors are added as required to deploy additional functionality.

51. The system for processing images of claim 27, wherein each of the plurality of image providers and the plurality of destination processors is hot swappable.

52. An autonomous system for processing data streams, comprising:
  a plurality of data providers configured to transmit data in a plurality of data streams;
  a plurality of destination processors configured to receive the transmitted data and to transform the transmitted data to internally useable data;
  a plurality of feature object engines configured to find and identify in the internally useable data a plurality of objects;
  a plurality of object classifier engines configured to index and classify the plurality of objects found by the feature object engines;
  a plurality of metadata inserters configured to embed information into the plurality of data streams; and
  a plurality of intelligent multiplexers or routers that use the metadata embedded in the plurality of data streams to route the video data to one or more downstream destination processors,
  wherein the information relates to a face comprising one or more of: facial biometrics, a position of the face, a size of the face, landmarks of the face, an orientation of the face, and a quality of the face image, and
  the intelligent multiplexers or routers use the metadata to dynamically prioritize the plurality of data streams to ensure that higher priority streams are assigned to operational downstream destination processors before assigning lower priority streams.

53. An autonomous system for processing data streams, comprising:
  a plurality of data providers configured to transmit data in a plurality of data streams;
  a plurality of destination processors configured to receive the transmitted data and to transform the transmitted data to internally useable data;
  a plurality of feature object engines configured to find and identify in the internally useable data a plurality of objects;
  a plurality of object classifier engines configured to index and classify the plurality of objects found by the feature object engines;
  a plurality of metadata inserters configured to embed information into the plurality of data streams; and
  a plurality of intelligent multiplexers or routers that use the metadata embedded in the plurality of image streams to route the data to one or more downstream destination processors,
  wherein the information relates to a face comprising one or more of: facial biometrics, a position of the face, a size of the face, landmarks of the face, an orientation of the face, and a quality of the face image, and
  the intelligent multiplexers or routers use the metadata to assign one of the plurality of data streams to more than one downstream destination processor to allow simultaneous identification of two or more different kinds of objects in the data stream.

* * * * *